US010289592B1

(12) United States Patent
Jones et al.

(10) Patent No.: US 10,289,592 B1
(45) Date of Patent: May 14, 2019

(54) LOCATION-BASED ADDRESS ADAPTER AND SYSTEM

(71) Applicant: FUNAI ELECTRIC CO., LTD., Osaka (JP)

(72) Inventors: Brian T. Jones, Lexington, KY (US); Michael A. Marra, III, Lexington, KY (US); Bruce A. Deboard, Georgetown, KY (US); James J. Tocash, Lexington, KY (US); Lucas D. Barkley, Lexington, KY (US)

(73) Assignee: FUNAI ELECTRIC CO., LTD. (JP)

( * ) Notice: Subject to any disclaimer, the term of this patent is extended or adjusted under 35 U.S.C. 154(b) by 0 days.

(21) Appl. No.: 15/807,686

(22) Filed: Nov. 9, 2017

(51) Int. Cl.
| G06F 13/40 | (2006.01) |
| G06F 13/38 | (2006.01) |
| G06F 13/12 | (2006.01) |
| G06F 1/26 | (2006.01) |
| G06F 9/4401 | (2018.01) |

(52) U.S. Cl.
CPC ............ *G06F 13/404* (2013.01); *G06F 1/266* (2013.01); *G06F 9/4411* (2013.01); *G06F 13/126* (2013.01); *G06F 13/387* (2013.01)

(58) Field of Classification Search
CPC ...... G06F 13/404; G06F 1/266; G06F 9/4411; G06F 13/126; G06F 13/387
USPC ................................................ 710/4; 174/50
See application file for complete search history.

(56) References Cited

U.S. PATENT DOCUMENTS

| 3,510,629 | A | * | 5/1970 | Deighton | G06F 15/10 235/433 |
| 3,753,047 | A | * | 8/1973 | Shallbetter | H02B 1/50 174/60 |
| 5,045,640 | A | * | 9/1991 | Riceman | H01R 13/447 174/67 |
| 5,499,346 | A | * | 3/1996 | Amini | G06F 11/10 710/311 |
| 5,564,114 | A | * | 10/1996 | Popat | G06F 13/4226 710/100 |
| 5,809,440 | A | * | 9/1998 | Beck | G06F 12/0684 47/1.7 |
| 5,909,430 | A | * | 6/1999 | Reaves | H04L 29/12018 370/254 |
| 6,131,119 | A | | 10/2000 | Fukui | |

(Continued)

*Primary Examiner* — Paul R. Myers
(74) *Attorney, Agent, or Firm* — Aust IP Law

(57) ABSTRACT

A location-based address adapter for use in a system to facilitate communication between a host computer and one peripheral device of a plurality of peripheral devices includes a body and an electrical circuit. The body is removably attached to one peripheral device at a time. The electrical circuit includes a communications interface circuit and an adapter memory circuit. The communications interface circuit has a respective pass-through wired connection between each of a plurality of input connectors and a plurality of output connectors to facilitate bi-directional communications between the host computer and the peripheral device. The adapter memory circuit stores a unique physical location address for association with a physical location associated with the peripheral device to which the body is attached. The unique physical location address is a non-network based address. The memory circuit has a memory connector to facilitate direct electrical communicative connection only with the respective peripheral device.

20 Claims, 5 Drawing Sheets

(56) References Cited

U.S. PATENT DOCUMENTS

| | | | | |
|---|---|---|---|---|
| 6,134,624 | A * | 10/2000 | Burns | G06F 12/084 710/316 |
| 6,151,211 | A * | 11/2000 | Dayan | G06F 1/181 165/104.33 |
| 6,535,110 | B1 * | 3/2003 | Arora | H04L 12/2803 340/12.32 |
| 7,366,157 | B1 * | 4/2008 | Valentine | H04M 3/5116 370/352 |
| 8,285,875 | B2 | 10/2012 | Gandhewar et al. | |
| 8,817,463 | B1 * | 8/2014 | Rose | G06F 1/189 174/500 |
| 8,825,897 | B2 * | 9/2014 | Kelly | G06F 9/4416 709/224 |
| 10,164,938 | B2 * | 12/2018 | Eckert | H04L 61/2015 |
| 2003/0018804 | A1 | 1/2003 | Laxman et al. | |
| 2003/0221001 | A1 | 11/2003 | Moran et al. | |
| 2005/0030194 | A1 * | 2/2005 | Cheng | G06F 16/9537 340/8.1 |
| 2009/0262382 | A1 | 10/2009 | Nobutani | |
| 2010/0185754 | A1 * | 7/2010 | Owen | G07F 9/026 709/220 |
| 2010/0289620 | A1 | 11/2010 | Aminger et al. | |
| 2011/0007665 | A1 | 1/2011 | Dinur | |
| 2012/0005656 | A1 * | 1/2012 | Chuang | G06F 13/385 717/124 |
| 2012/0066356 | A1 * | 3/2012 | Nguyen | H04L 29/12254 709/220 |
| 2015/0220409 | A1 * | 8/2015 | Shao | G06F 11/2007 714/4.5 |
| 2015/0282281 | A1 * | 10/2015 | Borsoi | H04L 27/04 315/297 |
| 2016/0255160 | A1 | 9/2016 | Pinney | |

* cited by examiner

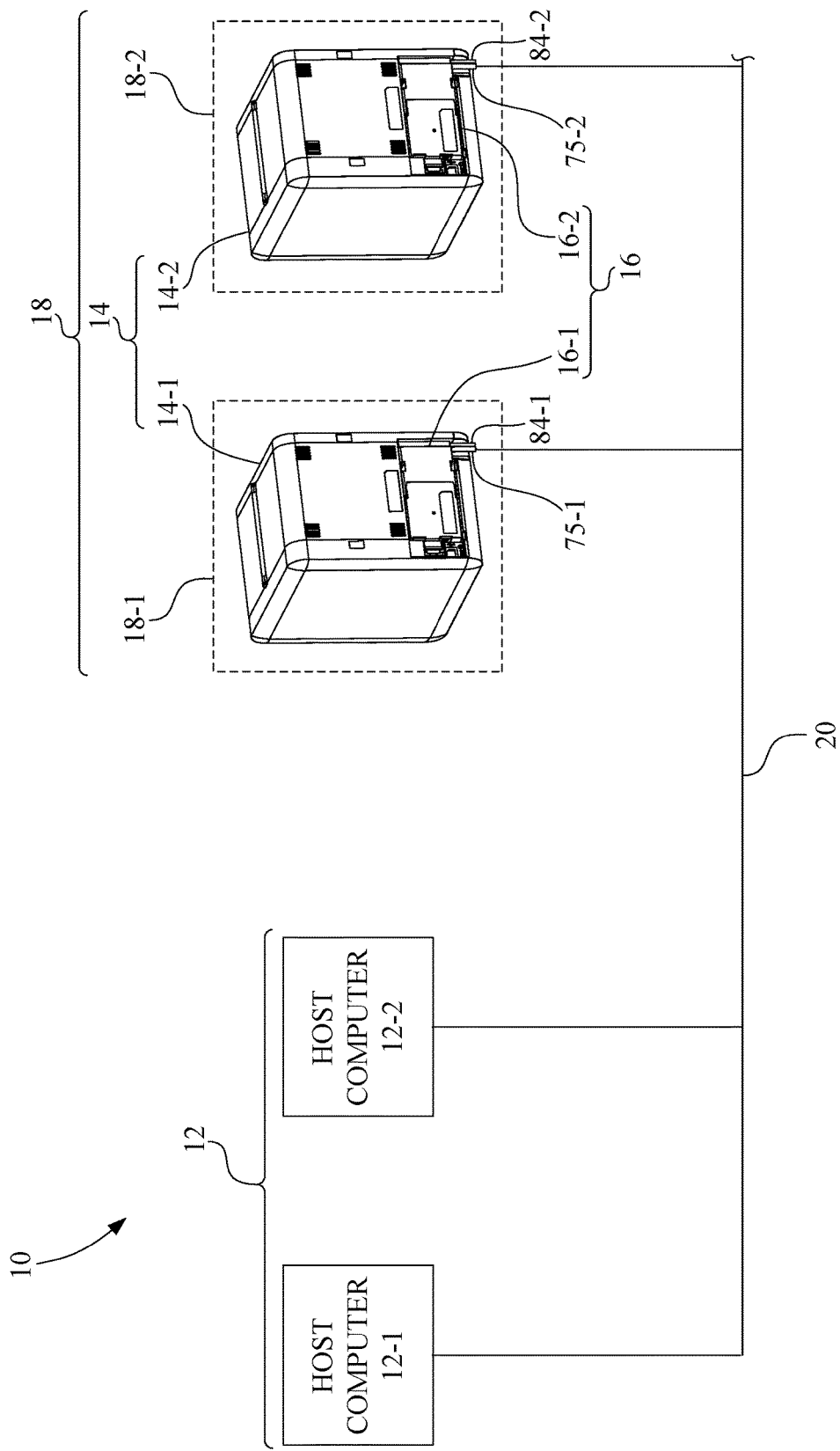

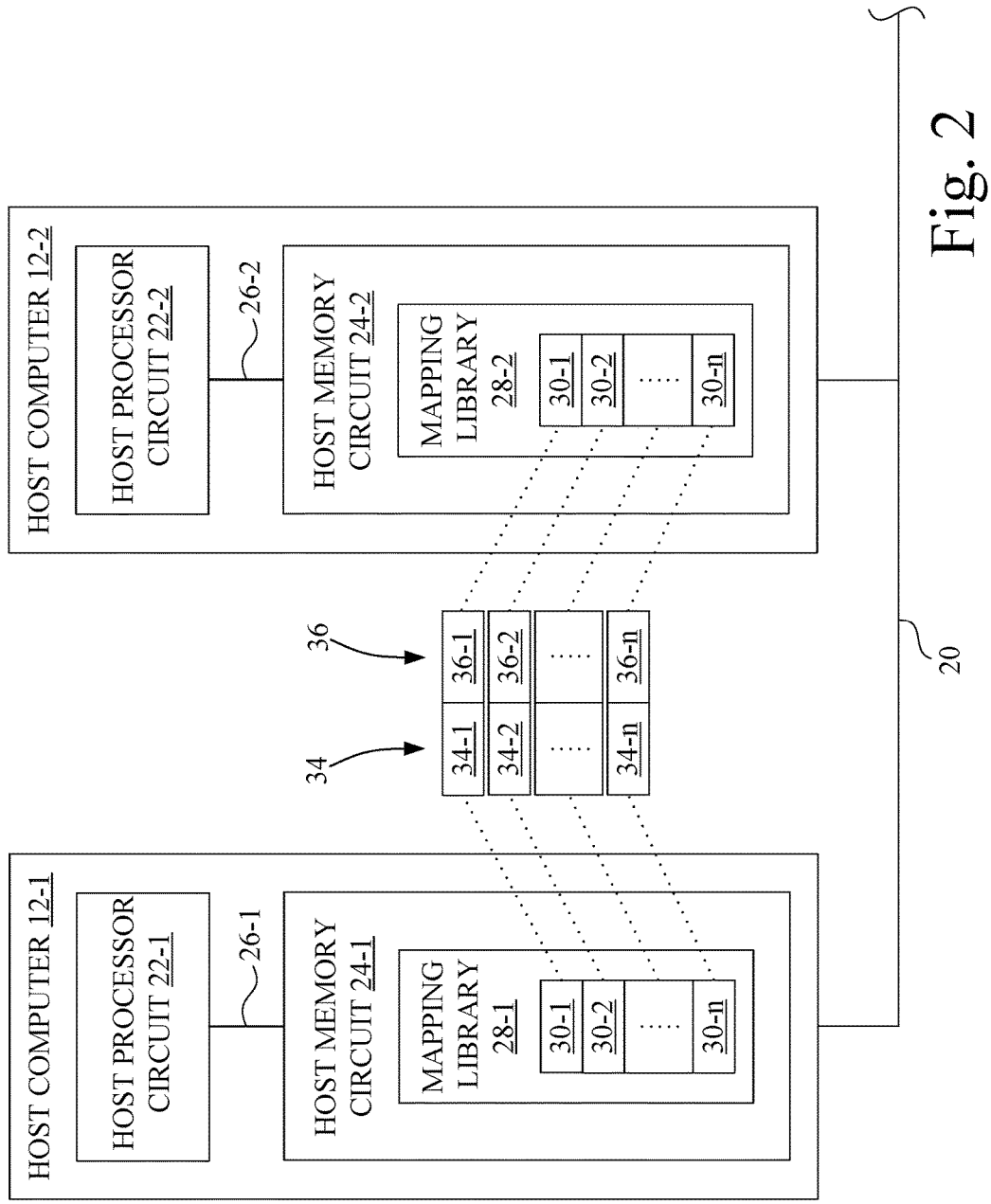

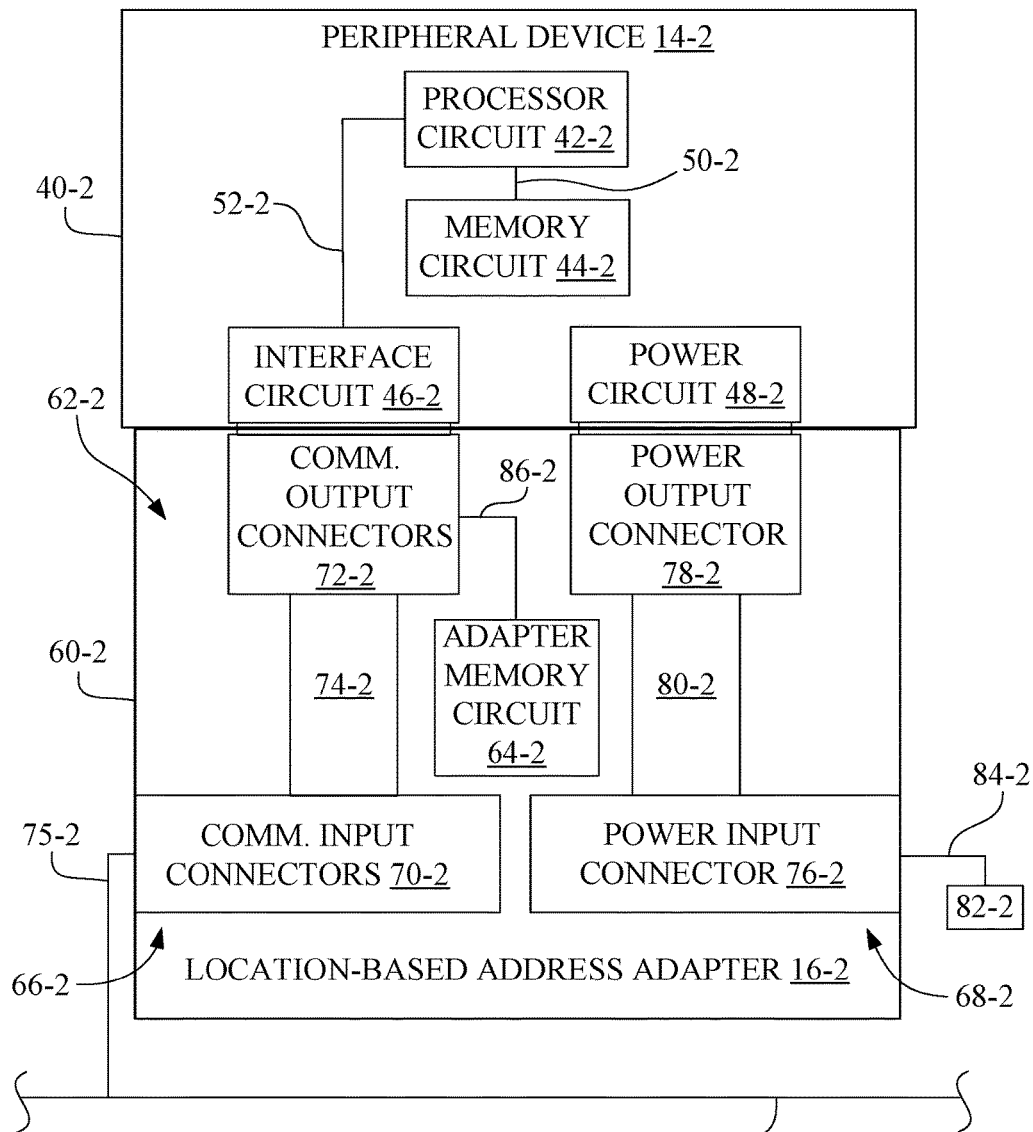
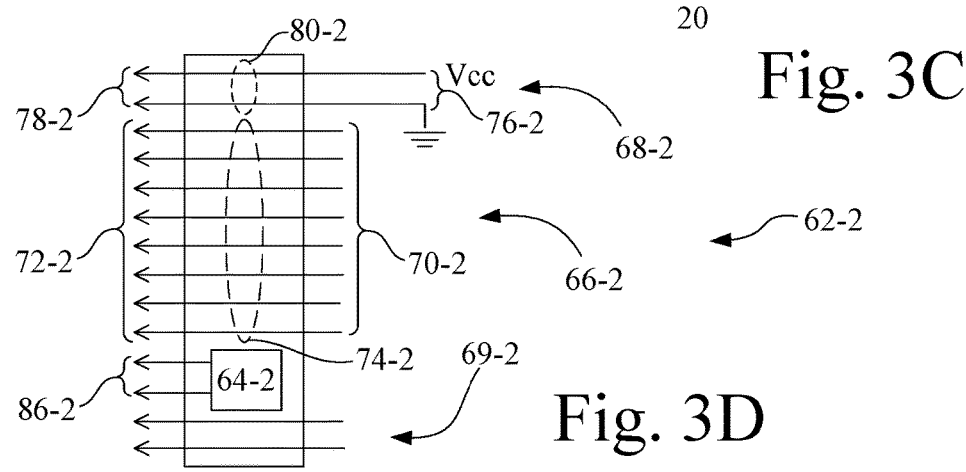
Fig. 3C
Fig. 3D

LOCATION-BASED ADDRESS ADAPTER AND SYSTEM

CROSS-REFERENCE TO RELATED APPLICATIONS

None.

BACKGROUND OF THE INVENTION

1. Field of the Invention

The present invention relates to address assignment of a peripheral device, and, more particularly, to a location-based address adapter and system to facilitate simple replacement of a peripheral device at a physical location.

2. Description of the Related Art

In many systems, a peripheral device is assigned to a location or to a base product within the system, and commands are addressed to the peripheral device based on the location or the assigned base product. As such, the replacement of the peripheral device at the location may be complicated because the address is associated with the peripheral device, and thus may require someone skilled in information technology (IT) to perform the peripheral replacement.

When devices on separate systems are to cooperate to provide a particular capability, e.g., printing, to the end user, then a mapping between the separate systems must be created and maintained. This mapping association is maintained in order to provide seamless and continuous function to the user.

For example, assume that a retail store has two separate systems within the store: namely, a point-of-sale (POS) system and an awards system that prints coupons relevant to a customer. The POS system may have multiple computerized cash registers, and the awards system may have multiple printers, with each printer associated with a particular physical location, such as a customer lane, within the store. The awards system receives information from the POS system about the item that is being purchased and sends the appropriate coupon images to the particular printer at the corresponding customer lane. The awards system must maintain a mapping between the POS device, e.g., a computerized cash register and the address of the printer associated with the particular physical location in the store.

If the printers communicate with the awards system via a network, then each network printer is addressed by its respective internet protocol (IP) address. However, a problem arises if a particular printer must be replaced. Since the network address generally moves with the printer, the map maintained by the awards system software becomes invalid, and the awards system must be reprogrammed to communicate with the new printer. In other words, in existing systems, the old printer cannot be easily and simply replaced with a new printer.

It is also known to address printers in a manner that does not rely on the network IP address of the printer. For example, Internet Protocol Printing (IPP) is an example of a method by which printers may also be addressed based on capability. However, IPP does not facilitate addressing a printer based on the physical location of the printer.

Also, it is known to maintain a map of communication bus nodes to physical locations (see, e.g., U.S. Pat. No. 6,131, 119). For example, IEEE 1394 is an interface standard that has a tree addressing structure, wherein the communication bus nodes are addressed based on their logical location in the tree addressing structure. A physical location of the peripheral may then be implied based on the logical location of the peripheral device, e.g., printer, on the communication bus. The content is delivered to the peripheral device over another (IP based) network. The network address (IP) of the peripheral device is communicated over the control bus and the content can be delivered to the correct location.

It is also known to use an adapter in a network (see, e.g., U.S. Publication No. 2009/0262382), wherein the adapter is positioned between an Ethernet cable and a printer, and wherein the adapter has a stored IP or media access control (MAC) address that may be associated with a particular location. However, such an approach is dependent upon standard MAC-to-IP mapping of an IP based network.

What is needed in the art is a location-based address adapter, and associated system, wherein the location-based address adapter defines a physical location address that is non-network based, and which is used to communicate with any peripheral device that is communicatively coupled to the location-based address adapter, to thereby facilitate simple replacement of a peripheral device communicatively coupled to the location-based address adapter.

SUMMARY OF THE INVENTION

The present invention provides a location-based address adapter, and associated system, wherein the location-based address adapter defines a physical location address that is non-network based, and which is used to communicate with any peripheral device that is communicatively coupled to the location-based address adapter, to thereby facilitate simple replacement of a peripheral device communicatively coupled to the location-based address adapter.

The invention, in one form, is directed to a location-based address adapter to facilitate communication between a host computer and one peripheral device of a plurality of peripheral devices. The location-based address adapter includes a body and an electrical circuit. The body is removably attachable to each peripheral device of the plurality of peripheral devices, but is removably attached to only one peripheral device at a time. The electrical circuit includes a communications interface circuit and an adapter memory circuit. The communications interface circuit has a plurality of communication input connectors, a plurality of communication output connectors, and a respective pass-through wired connection between each of the plurality of communication input connectors and the plurality of communication output connectors to facilitate bi-directional communications between the host computer and a respective peripheral device to which the body is attached. The adapter memory circuit stores a unique physical location address to be associated with a physical location associated with the peripheral device to which the body is attached. The unique physical location address is a non-network based address. The memory circuit has a memory connector to facilitate direct electrical communicative connection only with the respective peripheral device and not to the host computer.

The invention, in another form, is directed to a system having a plurality of peripheral devices at a plurality of peripheral device physical locations. A host computer has a host processor circuit and a host memory circuit. The host memory circuit is communicatively coupled to the host processor circuit. The host memory circuit includes a mapping library that stores a plurality of address maps. Each address map has a respective unique physical location address and an associated respective peripheral device network address. A peripheral device of the plurality of peripheral devices has a housing. A location-based address adapter is removably attached to the housing. The location-based address adapter has a communications interface circuit and an adapter memory circuit. The communications interface circuit is connected in electrical communication with the peripheral device and with the host computer. The adapter memory circuit stores a unique physical location address to be associated with a physical location of the plurality of peripheral device physical locations. The unique physical location address is a non-network based address. The adapter memory circuit is communicatively connected only to the peripheral device.

The invention, in another form, is directed to a system having a plurality of peripheral devices at a plurality of peripheral device physical locations. The system includes a host computer, a first peripheral device, and a second peripheral device. The host computer has a host processor circuit and a host memory circuit. The host memory circuit is communicatively coupled to the host processor circuit. The host memory circuit includes a mapping library that stores a plurality of address maps, each address map having a respective unique physical location address and an associated respective peripheral device network address. The first peripheral device has a first housing. A second peripheral device has a second housing. A first location-based address adapter is removably attached to the first housing. The first location-based address adapter has a first communications interface circuit and a first adapter memory circuit. The first communications interface circuit is connected in electrical communication with the first peripheral device and with the host computer. The first adapter memory circuit stores a first unique physical location address to be associated with a first physical location of the plurality of peripheral device physical locations. The first unique physical location address is a first non-network based address. The first adapter memory circuit is communicatively connected only to the first peripheral device. The second location-based address adapter is removably attached to the second housing. The second location-based address adapter has a second communications interface circuit and a second adapter memory circuit. The second communications interface circuit is connected in electrical communication with the second peripheral device and the host computer. The second adapter memory circuit stores a second unique physical location address to be associated with a second physical location of the plurality of peripheral device physical locations. The second unique physical location address is a second non-network based address. The second adapter memory circuit is communicatively connected only to the second peripheral device.

Some of the advantages of the disclosed embodiment of present invention set forth below are as follows:

1. All required power and communication connections run through the location-based address adapter. This simplifies the physical installation of a peripheral device, such as a replacement peripheral device.

2. Electrical power is included in the connections to the peripheral device that is made by the location-based address adapter. In addition to simplifying the physical connection, this creates only one instance, i.e., power ON, when the physical location-based address (i.e., physical location ID) must be read from the location-based address adapter memory. The physical location-based address does not have to be read at any other trigger in the network (for example, through polling or by detecting cable plug in).

3. A non-network based address is used as the physical location-based address. This makes the system independent of the network configuration or the type of network. Thus, the location-based address adapter is independent of the actual type of network, e.g., Ethernet, Bluetooth®, etc., in which the location-based address adapter is being used.

4. The location mapping is automatically maintained by the system if the network address is changed (e.g., if a network component, such as a router, is rebooted).

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a diagram of a network system having a plurality of host computers, and having a plurality of peripheral devices at different physical locations, with each peripheral device having a respective location-based address adapter.

FIG. 2 is a block diagram of each of two host computers depicted in FIG. 1, including respective mapping libraries.

FIG. 3C is a block diagram of another peripheral device of the plurality of peripheral devices depicted in FIG. 1, and a block diagram of the associated location-based address adapter attached to the housing of the peripheral device.

FIG. 3D is an electrical schematic of an electrical circuit of the location-based address adapter of FIG. 3C.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 3A:
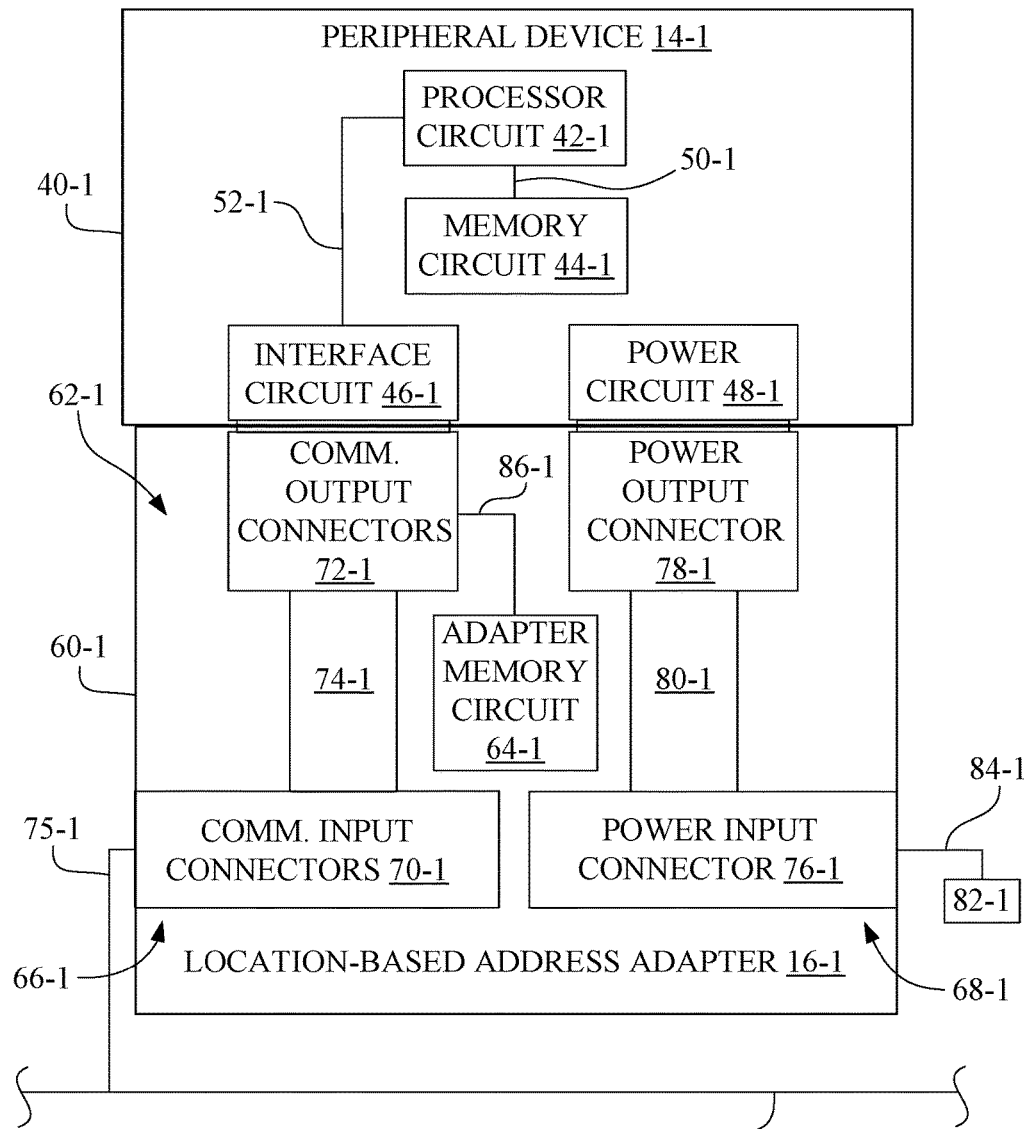
FIG. 3A is a block diagram of one peripheral device of the plurality of peripheral devices depicted in FIG. 1, and a block diagram of the associated location-based address adapter attached to the housing of the peripheral device.

Referring now to the drawings, and more particularly to FIG. 1, there is shown a network system 10 in accordance with an aspect of the present invention. Network system 10 will include at least one host computer 12, at least one peripheral device 14, and at least one location-based address adapter 16, and more often may include a plurality of host computers 12, and a plurality of peripheral devices 14 and a corresponding plurality of location-based address adapters 16. Each of the plurality of peripheral devices 14 and each of the plurality of location-based address adapters 16 is located at a respective physical location of a plurality of peripheral device physical locations 18. The physical locations may be, for example, various locations throughout one or more retail stores, warehouses, and/or offices.

For ease of discussion, and without limitation, the invention will be described with respect to a simplified system having two host computers 12, individually identified as host computer 12-1 and host computer 12-2; two peripheral devices 14, individually identified as peripheral device 14-1 and peripheral device 14-2; and two location-based address adapters 16, individually identified as location-based address adapter 16-1 and location-based address adapter 16-2. In the present example, each peripheral device 14-1, 14-2 will be positioned at a respective physical location 18-1, 18-2 of the plurality of peripheral device physical locations 18.

More particularly, in this example, location-based address adapter 16-1 is assigned to a physical location 18-1, and peripheral device 14-1 will be connected to location-based address adapter 16-1 at physical location 18-1, such that peripheral device 14-1 also is assigned to physical location 18-1 of the plurality of peripheral device physical locations 18. Likewise, location-based address adapter 16-2 is assigned to physical location 18-2, and peripheral device 14-2 will be connected to location-based address adapter 16-2 at physical location 18-2, such that peripheral device 14-2 also is assigned to physical location 18-2 of the plurality of peripheral device physical locations 18.

Each of the host computers 12 and peripheral devices 14 communicate over network 20, via location-based address adapters 16, using a standardized network communication protocol, such as for example, Ethernet, Bluetooth, etc. However, in accordance with an aspect of the present invention, each of the location-based address adapters 16 is network independent, as will be described in more detail below, and is used to simplify replacement of one peripheral device with another peripheral device at a particular physical location, e.g., in the event of peripheral device failure, by a simple substitution that does not require expertise in network communication.

Network 20 may be a wired network (e.g., wired Ethernet), a wireless network (e.g., wireless Ethernet (using IEEE 802.11) or Bluetooth (using IEEE 802.15.1)), or a combination of both wired and wireless, e.g. Ethernet. Network 20 has associated wired and/or wireless interface devices (e.g., communication cards, cable connectors, etc.) that facilitate communication using the particular standardized communication protocol selected for network 20, as is known in the art. In particular, each of host computers 12 and each of the plurality of peripheral devices 14 includes communication hardware and software to facilitate bi-directional communication over network 20, which will occur in accordance with an aspect of the present invention via respective location-based address adapters 16.

Each of host computers 12 may be, for example, one of a point-of-sale (POS) terminal, a personal computer, a file server having multiple user interface terminals, etc. Each of the plurality of peripheral devices 14 may be, for example, one or more of a printer, an image scanner, a barcode scanner, etc., wherein each peripheral device 14-1, 14-2 will be associated with a particular physical location 18-1, 18-2, respectively, of the plurality of peripheral device physical locations 18.

Referring also to FIG. 2, host computer 12-1 has a host processor circuit 22-1 and a host memory circuit 24-1. Host memory circuit 24-1 is communicatively coupled to the host processor circuit 22-1 via a wired communications link 26-1, e.g., via a bus circuit, or circuit traces.

Host processor circuit 22-1 has one or more programmable microprocessors and associated circuitry, such as an input/output interface, clock, buffers, memory, etc., as is known in the art.

Host memory circuit 24-1 is a non-transitory electronic memory, and may include volatile memory circuits, such as random access memory (RAM), and non-volatile memory circuits, such as read only memory (ROM), electronically erasable programmable ROM (EEPROM), NOR flash memory, NAND flash memory, etc. Host memory circuit 24-1 includes a mapping library 28-1, which may be in the form of a plurality of segregated memory locations, that stores a plurality of address maps 30-1, 30-2, ... 30-*n*, wherein n is a natural number that designates the maximum number of address maps that host computer 12-1 can accommodate. Each address map 30-1, 30-2, ... 30-*n* stored in mapping library 28-1 is a two-part address provided by a respective one of the plurality of peripheral devices 14, with the two-part address having a respective unique physical location address, i.e., one of a plurality of potential unique physical location addresses 34 (e.g., 34-1, 34-2, ... 34-*n*), that was stored in a respective location-based address adapter of the plurality of location-based address adapters 16, and a respective peripheral device network address, i.e., one of the plurality of potential peripheral device network addresses 36 (e.g., 36-1, 36-2, ... 36-*n*), assigned by network system 10 to the peripheral device that is attached to the respective location-based address adapter.

Likewise, as shown in FIG. 2, host computer 12-2 has a host processor circuit 22-2 and a host memory circuit 24-2. Host memory circuit 24-2 is communicatively coupled to the host processor circuit 22-2 via a wired communications link 26-2, e.g., via a bus circuit, or circuit traces.

Host processor circuit 22-2 has one or more programmable microprocessors and associated circuitry, such as an input/output interface, clock, buffers, memory, etc., as is known in the art.

Host memory circuit 24-2 is a non-transitory electronic memory, and may include volatile memory circuits, such as random access memory (RAM), and non-volatile memory circuits, such as read only memory (ROM), electronically erasable programmable ROM (EEPROM), NOR flash memory, NAND flash memory, etc. Host memory circuit 24-2 includes a mapping library 28-2, which may be in the form of a plurality of segregated memory locations, that store the plurality of address maps 30-1, 30-2 ... 30-*n*. Again, each address map 30-1, 30-2 ... 30-*n* stored in mapping library 28-2 is a two-part address generated and provided by a respective one of the plurality of peripheral devices 14, with the two-part address having a respective unique physical location address, i.e., one of the plurality of potential unique physical location addresses 34 (e.g., 34-1, 34-2, ... 34-*n*), that was stored in a respective location-based address adapter of the plurality of location-based address adapters 16, and a respective peripheral device network address, i.e., one of the plurality of potential peripheral device network addresses 36 (e.g., 36-1, 36-2, ... 36-*n*), assigned by network system 10 to the peripheral device that is attached to the respective location-based address adapter.

While in the present example the contents of mapping library 28-1 of host computer 12-1 and mapping library 28-2 of host computer 12-2 are identical, such may not be the case in all systems, such as for example, when one of the host computers 12 does not support one of the peripheral devices on network 20.

Referring also to FIG. 3A, peripheral device 14-1 has a housing 40-1, a peripheral device processor circuit 42-1, a peripheral device memory circuit 44-1, an interface circuit 46-1, a power circuit 48-1, a wired communications link 50-1, and a wired communications link 52-1. Peripheral device memory circuit 44-1 is communicatively coupled to the peripheral device processor circuit 42-1 via wired communications link 50-1, e.g., via a bus circuit, or circuit traces. Interface circuit 46-1 is communicatively coupled to the peripheral device processor circuit 42-1 via wired communications link 52-1, e.g., via a bus circuit, or circuit traces. In the present example, peripheral device 14-1 is an inkjet printer, but could be another type of peripheral device, such as a laser printer, barcode reader, etc.

Interface circuit 46-1 includes electronic components and electrical connectors to accommodate communication with location-based address adapter 16-1. Power circuit 48-1 includes electronic components and electrical connectors to accommodate electrical power connection with location-based address adapter 16-1, with power circuit 48-1 including electrical components to supply the electrical power requirements within peripheral device 14-1.

Peripheral device processor circuit 42-1 may be configured via software and/or firmware to operate as a printer controller for performing printing functions. Peripheral device processor circuit 42-1 has one or more programmable microprocessors and associated circuitry, such as an input/output interface, clock, buffers, memory, etc., as is known in the art. Peripheral device memory circuit 44-1 is a non-transitory electronic memory that may include volatile memory circuits, such as random access memory (RAM), and non-volatile memory circuits, such as read only memory (ROM), electronically erasable programmable ROM (EEPROM), NOR flash memory, NAND flash memory, etc.

Likewise, as shown in FIG. 3C, peripheral device 14-2 has a housing 40-2, a peripheral device processor circuit 42-2, a peripheral device memory circuit 44-2, an interface circuit 46-2, a power circuit 48-2, a wired communications link 50-2, and a wired communications link 52-2. Peripheral device memory circuit 44-2 is communicatively coupled to the peripheral device processor circuit 42-2 via wired communications link 50-2, e.g., via a bus circuit, or circuit traces. Interface circuit 46-2 is communicatively coupled to the peripheral device processor circuit 42-2 via wired communications link 52-2, e.g., via a bus circuit, or circuit traces. In the present example, peripheral device 14-2 is a laser printer, but could be another type of peripheral device, such as an inkjet printer, barcode reader, etc.

Interface circuit 46-2 includes electronic components and electrical connectors to accommodate communication with location-based address adapter 16-2. Power circuit 48-2 includes electronic components and electrical connectors to accommodate electrical power connection with location-based address adapter 16-2, with power circuit 48-2 including electrical components to supply the electrical power requirements within peripheral device 14-2.

Peripheral device processor circuit 42-2 may be configured via software and/or firmware to operate as a printer controller for performing printing functions. Peripheral device processor circuit 42-2 has one or more programmable microprocessors and associated circuitry, such as an input/output interface, clock, buffers, memory, etc., as is known in the art. Peripheral device memory circuit 44-2 is a non-transitory electronic memory that includes a volatile memory circuit, such as random access memory (RAM), and non-volatile memory circuits, such as read only memory (ROM), electronically erasable programmable ROM (EEPROM), NOR flash memory, NAND flash memory, etc.

Referring again to FIG. 1, location-based address adapter 16-1 facilitates communication between at least one of host computers 12, e.g., host computer 12-1, and a particular peripheral device, e.g., peripheral device 14-1, of a plurality of peripheral devices that may be associated, one at a time, with the same physical location, e.g., physical location 18-1 to which location-based address adapter 16-1 is assigned.

Figure 3B:
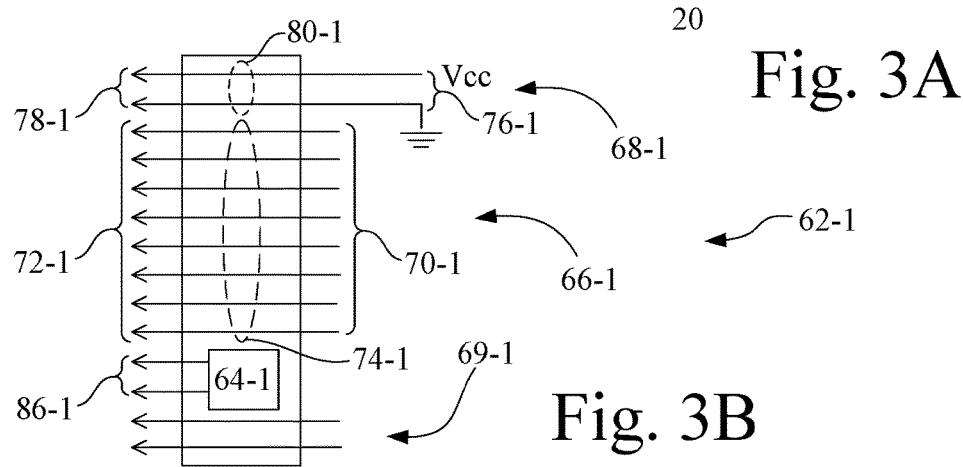
FIG. 3B is an electrical schematic of an electrical circuit of the location-based address adapter of FIG. 3A.

Referring again also to FIG. 3A, location-based address adapter 16-1 includes a body 60-1, and an electrical circuit 62-1 that includes an adapter memory circuit 64-1, a communications interface circuit 66-1, and an electrical power circuit 68-1. FIG. 3B is an electrical diagram of electrical circuit 62-1 of location-based address adapter 16-1. Optionally, electrical circuit 62-1 may include an auxiliary circuit 69-1 that includes connectors for interfacing an auxiliary device, such as a telephone, to the peripheral device to which location-based address adapter 16-1, e.g., peripheral device 14-1, is attached.

Body 60-1 is removably attachable to each peripheral device of the plurality of peripheral devices 14, but is removably attached to only one peripheral device of the plurality of peripheral devices 14 at a time. In the present example, body 60-1 is removably attached to peripheral device 14-1. As used herein, the term "removably attached" means a fixed attachment that can be reversed by an overt user operation to detach the body from the peripheral device.

Referring to FIGS. 3A and 3B, in the present example, communications interface circuit 66-1 is connected in electrical communication with peripheral device 14-1, and is connected in electrical communication with each of host computer 12-1 and host computer 12-2 via network 20. Communications interface circuit 66-1 includes a plurality of communication input connectors 70-1, a plurality of communication output connectors 72-1, and a pass-through wired connection 74-1 between each of the plurality of communication input connectors and the plurality of communication output connectors 72-1 to facilitate bi-directional communications between host computer 12-1 and/or host computer 12-2 and a respective peripheral device, e.g., peripheral device 14-1, to which body 60-1 is removably attached. More particularly, the plurality of communication output connectors 72-1 is removably attached to an interface circuit, e.g., interface circuit 46-1, of the respective peripheral device, e.g., peripheral device 14-1, to which body 60-1 is removably attached, and the plurality of communication input connectors 70-1 is connected in electrical communication with network 20, either with a wired connection via a communication cable 75-1, e.g., Ethernet cable in an Ethernet network environment, or a wireless connection via an external wireless radio frequency (r.f.) device (not shown) in a wireless environment.

Electrical power circuit 68-1 includes a power input connector 76-1, a power output connector 78-1, and a pass-through connection 80-1 between power input connector 76-1 and power output connector 78-1. Power input connector 76-1 facilitates electrical connection to an external power source 82-1, such as a DC power supply (i.e., Vcc and ground) or alternatively to an AC power supply, via an electrical power cable 84-1. Power output connector 78-1 facilitates electrical connection to the respective power circuit, e.g., power circuit 48-1, of the respective peripheral device, e.g., peripheral device 14-1, to which body 60-1 is removably attached.

Adapter memory circuit 64-1 is a non-transitory electronic memory that has a non-volatile memory circuit, such as read only memory (ROM), electronically erasable programmable ROM (EEPROM), NOR flash memory, NAND flash memory, etc.

Adapter memory circuit 64-1 stores a unique physical location address, e.g., 34-1, to be associated with a physical location, e.g., 18-1. For example, unique physical location address 34-1 may be programmed into adapter memory circuit 64-1 at the time of manufacture of location-based address adapter 16-1. In implementations wherein adapter memory circuit 64-1 is programmable, adapter memory circuit 64-1 may store information relating to the environment within which location-based address adapter 16-1 is, or has been, used, such as for example, by storing an identification code for each peripheral device to which location-based address adapter 16-1 has been attached.

Adapter memory circuit 64-1 has a memory connector 86-1, e.g., wire cable, bus, or circuit traces, to facilitate electrical communicative connection only with the respective peripheral device, e.g., peripheral device 14-1, to which location-based address adapter 16-1 is attached, and not to any of host computers 12. In other words, host computers 12 or other devices on network 20 cannot retrieve or read the memory contents of adapter memory circuit 64-1. In the present embodiment, this is a direct electrical communicative connection with the respective peripheral device, e.g., peripheral device 14-1.

The unique physical location address 34-1 stored in adapter memory circuit 64-1 of location-based address adapter 16-1 is a non-network based address that is to be associated with only one physical location of the plurality of peripheral device physical locations 18 of communication network 20, and is not to be used in association with any other location-based address adapter of the plurality of location-based address adapters 16 used in network 20. As used herein, the term "non-network based address" is a physical location address that is not in an address format used in the communication protocol associated with the standardized network within which communication between network devices, e.g., a host computer and a peripheral, is to occur. The unique physical location address, e.g., 34-1, is to be associated with a particular one of the plurality of peripheral device physical locations 18 of communication network 20. As used herein, the term "unique" means only a single occurrence in a particular network, e.g., network 20.

For example, the unique physical location address 34-1 stored in adapter memory circuit 64-1 is a non-network based address, and thus, in an Ethernet network, the unique physical location address 34-1 is not in an Internet Protocol (IP) address format and is not in a media access code (MAC) address format. Rather, the unique physical location address 34-1 stored in adapter memory circuit 64-1 may be a combination of alpha characters, numeric characters, and spaces, e.g., ID 872655.

Referring again to FIG. 1, location-based address adapter 16-2 facilitates communication between at least one of host computers 12, e.g., host computer 12-2, and a particular peripheral device, e.g., peripheral device 14-2, of a plurality of peripheral devices that may be associated, one at a time, with the same physical location, e.g., physical location 18-2 to which location-based address adapter 16-2 is assigned.

Referring again also to FIG. 3C, location-based address adapter 16-2 includes a body 60-2, and an electrical circuit 62-2 that includes an adapter memory circuit 64-2, a communications interface circuit 66-2, and an electrical power circuit 68-2. FIG. 3D is an electrical diagram of electrical circuit 62-2 of location-based address adapter 16-2. Optionally, electrical circuit 62-2 may include an auxiliary circuit 69-2 that includes connectors for interfacing an auxiliary device, such as a telephone, to the peripheral device to which location-based address adapter 16-2, e.g., peripheral device 14-2, is attached.

Body 60-2 is removably attachable to each peripheral device of the plurality of peripheral devices 14, but is removably attached to only one peripheral device of the plurality of peripheral devices 14 at a time. In the present example, body 60-2 is removably attached to peripheral device 14-2.

In the present example, communications interface circuit 66-2 is connected in electrical communication with peripheral device 14-2, and is connected in electrical communication with each of host computer 12-1 and host computer 12-2 via network 20. Communications interface circuit 66-2 includes a plurality of communication input connectors 70-2, a plurality of communication output connectors 72-2, and a pass-through wired connection 74-2 between each of the plurality of communication input connectors and the plurality of communication output connectors 72-2 to facilitate bi-directional communications between host computer 12-1 and/or host computer 12-2 and a respective peripheral device, e.g., peripheral device 14-2, to which body 60-2 is removably attached. More particularly, the plurality of communication output connectors 72-2 is removably attached to an interface circuit, e.g., interface circuit 46-2, of the respective peripheral device, e.g., peripheral device 14-2, to which body 60-2 is removably attached, and the plurality of communication input connectors 70-2 is connected in electrical communication with network 20, either with a wired connection via a communication cable 75-2, e.g., Ethernet cable in an Ethernet network environment, or a wireless connection via an external wireless radio frequency (r.f.) device (not shown) in a wireless environment.

Electrical power circuit 68-2 includes a power input connector 76-2, a power output connector 78-2, and a pass-through connection 80-2 between power input connector 76-2 and power output connector 78-2. Power input connector 76-2 facilitates electrical connection to an external power source 82-2, such as a DC power supply (i.e., Vcc and ground) or alternatively to an AC power supply, via an electrical power cable 84-2. Power output connector 78-2 facilitates electrical connection to the respective power circuit, e.g., power circuit 48-2, of the respective peripheral device, e.g., peripheral device 14-2, to which body 60-2 is removably attached.

Adapter memory circuit 64-2 is a non-transitory electronic memory that has a non-volatile memory circuit, such as read only memory (ROM), electronically erasable programmable ROM (EEPROM), NOR flash memory, NAND flash memory, etc. Adapter memory circuit 64-2 stores a unique physical location address, e.g., 34-2, to be associated with a physical location, e.g., 18-2. For example, unique physical location address 34-2 may be programmed into adapter memory circuit 64-2 at the time of manufacture of location-based address adapter 16-2. In implementations wherein adapter memory circuit 64-2 is programmable, adapter memory circuit 64-2 may store information relating to the environment within which location-based address adapter 16-2 is, or has been, used, such as for example, by storing an identification code for each peripheral device to which location-based address adapter 16-2 has been attached.

Adapter memory circuit 64-2 has a memory connector 86-2, e.g., wire cable, bus, or circuit traces, to facilitate electrical communicative connection only with the respective peripheral device, e.g., peripheral device 14-2, to which location-based address adapter 16-2 is attached, and not to any of host computers 12. In other words, host computers 12 or other devices on network 20 cannot retrieve or read the memory contents of adapter memory circuit 64-2. In the present embodiment, this is a direct electrical communicative connection with the respective peripheral device, e.g., peripheral device 14-2.

The unique physical location address 34-2 stored in adapter memory circuit 64-2 of location-based address adapter 16-2 is a non-network based address that is to be associated with only one physical location of the plurality of peripheral device physical locations 18 of communication network 20, and is not to be used in association with any other location-based address adapter of the plurality of location-based address adapters 16 used in network 20. Again, as used herein, the term "non-network based address" is a physical location address that is not in an address format used in the communication protocol associated with the standardized network within which communication between network devices, e.g., a host computer and a peripheral, is to occur. The unique physical location address 34-2 is to be associated with a particular one of the plurality of peripheral device physical locations 18 of communication network 20.

For example, the unique physical location address 34-2 stored in adapter memory circuit 64-2 is a non-network based address, and thus, in an Ethernet network, unique physical location address 34-2 is not in an Internet Protocol (IP) address format and is not in a media access code (MAC) address format. Rather, the unique physical location address 34-2 stored in adapter memory circuit 64-2 may be a combination of alpha characters, numeric characters, and spaces, e.g., ID 234587.

Figure 4A:
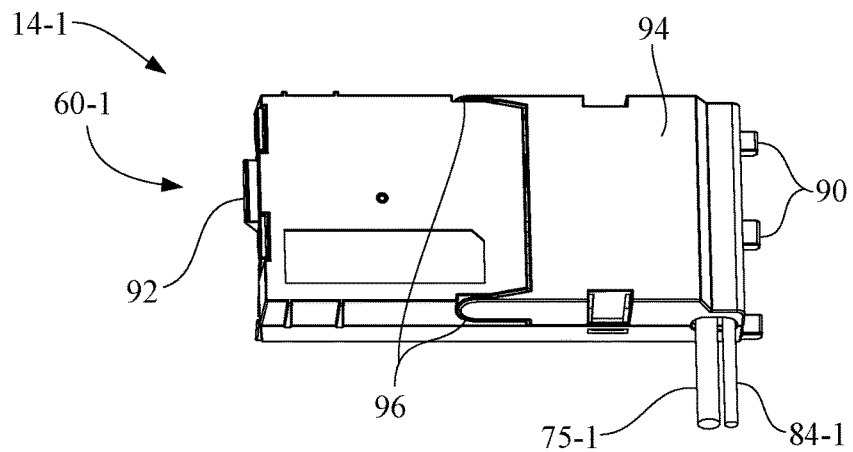
FIG. 4A is a top view in perspective of the location-based address adapter of FIG. 3A.
Figure 4B:
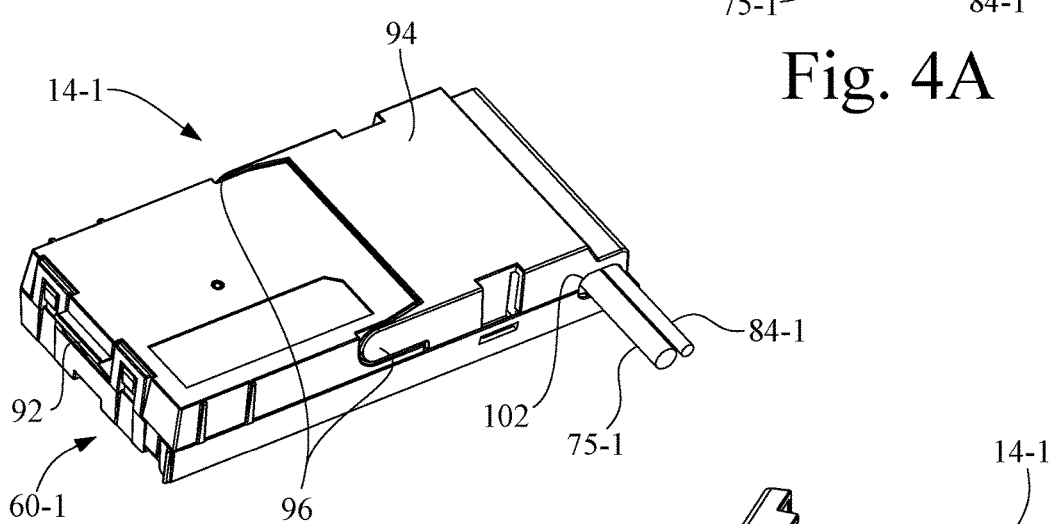
FIG. 4B is a perspective view of the location-based address adapter of FIG. 3A, with the hinged door in the closed position.
Figure 4C:
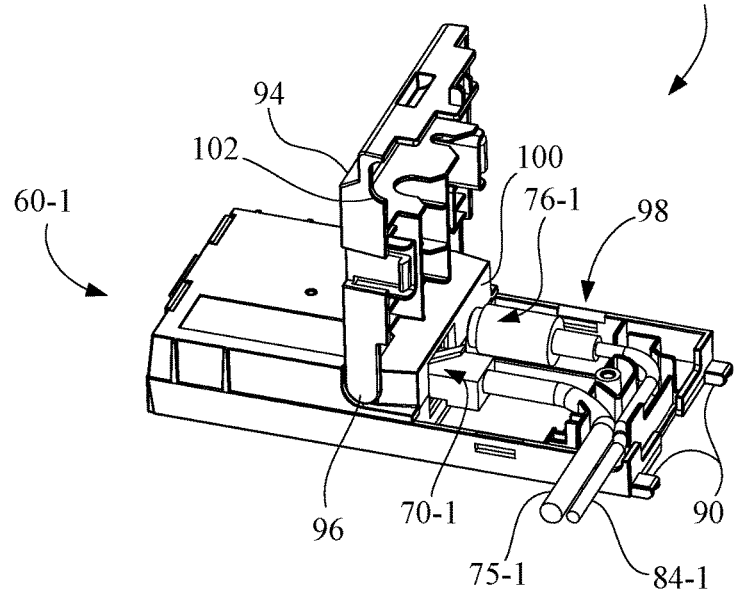
FIG. 4C is a perspective view of the location-based address adapter of FIG. 3A, with the hinged door in the open position.

FIGS. 4A-4C show an example of body 60-1 of location-based address adapter 16-1. It is to be noted that the construction of body 60-1 of location-based address adapter 16-1 and body 60-2 (see also FIG. 3C) of location-based address adapter 16-2 are identical, and that the discussion that follows directed to body 60-1 equally applies to each of the plurality of location-based address adapters 16.

Body 60-1 is removably attachable to a peripheral device of the plurality of peripheral devices 14 via a tab and latch arrangement that includes tabs 90 and latch 92. Body 60-1 includes a hinged door 94 pivotably attached to body 60-1 via hinges 96. Body 60-1 has a recessed region 98 having a side wall 100 where each of the plurality of communication input connectors 70-1 and the power input connector(s) 76-1 are accessed. Hinged door 94, when closed, covers recessed region 98 and the plurality of communication input connectors 70-1 and the power input connector(s) 76-1. Hinged door 94 has at least one aperture 102 to accommodate passage of at least one communication cable 75-1, e.g., Ethernet cable, and the electrical power cable 84-1, into recessed region 98 when hinged door 94 is closed, so as to accommodate the attachment of communication cable 75-1 and electrical power cable 84-1 to the plurality of communication input connectors 70-1 and the power input connector(s) 76-1 with hinged door 94 closed.

The operation of network system 10, configured in accordance with the present invention, is described below.

When location-based address adapter 16-1 is initially connected to housing 40-1 of peripheral device 14-1, peripheral device processor circuit 42-1 of peripheral device 14-1 executes program instructions to retrieve the non-network unique physical location address 34-1, e.g., ID 872655, from adapter memory circuit 64-1 of location-based address adapter 16-1. Peripheral device processor circuit 42-1 then executes program instructions to establish an address map 30-1 that associates the non-network unique physical location address 34-1, e.g., ID 872655, stored in adapter memory circuit 64-1 of location-based address adapter 16-1 with a first peripheral device network address 36-1 (e.g., 191.168.1.100) associated with peripheral device 14-1.

Likewise, when location-based address adapter 16-2 is initially connected to housing 40-2 of peripheral device 14-2, then peripheral device processor circuit 42-2 of peripheral device 14-2 executes program instructions to retrieve the unique physical location address 34-2, e.g., ID 234587, from adapter memory circuit 64-2 of location-based address adapter 16-2. Peripheral device processor circuit 42-2 then executes program instructions to establish an address map 30-2 that associates the unique physical location address 34-2, e.g., ID 234587, stored in adapter memory circuit 64-2 of location-based address adapter 16-2 with a second peripheral device network address 36-2 (e.g., 191.168.1.101) associated with peripheral device 14-2.

In response to a broadcast request for available services from one of host computers 12, e.g., either or both of host computer 12-1 and host computer 12-2, the peripheral device processor circuit 42-1 of peripheral device 14-1 executes program instructions to broadcast address map 30-1. Likewise, peripheral device processor circuit 42-2 of peripheral device 14-2 executes program instructions to respond to the broadcast request for available services from the respective host computer 12-1 and/or 12-2 by broadcasting address map 30-2. By using broadcasting to transmit the respective address map, neither peripheral device 14-1 nor peripheral device 14-2 needs to know the network address respectively assigned to each of host computer 12-1 and host computer 12-2.

For this example, assume that host computer 12-1 sent the broadcast request for available services. Host computer 12-1 then listens for a broadcast reply, and host processor circuit 22-1 executes program instructions to receive each of broadcasted address map 30-1 and broadcasted address map 30-2 and, in turn, stores each of address map 30-1 and address map 30-2 in mapping library 28-1 of host memory circuit 24-1.

Further, assume that host computer 12-2 also sent a broadcast request for available services, which in turn was replied to by a respective broadcast from each of peripheral device 14-1 and peripheral device 14-2. Host computer 12-2 then listens for a broadcast reply, and host processor circuit 22-2 executes program instructions to receive each of broadcasted address map 30-1 and broadcasted address map 30-2 and, in turn, stores each of address map 30-1 and address map 30-2 in mapping library 28-2 of host memory circuit 24-2.

Each of host computer 12-1 and host computer 12-2 runs at least one client application program, such as for example, a word processing application program, a spreadsheet application program, etc. With the present embodiment of the invention, the client application program is never aware of a respective peripheral device network address, e.g., one of peripheral device network address 36-1, 36-2, . . . **36-*n*, associated with any of the plurality of peripheral devices 14**. Alternatively, in another implementation, if client application program awareness of the respective peripheral device network address is not a concern, then the client application could use the address map to access the network address and use the network address directly instead of going through a library routine.

For the example that follows, assume that the user of host computer 12-1 is running a client application program, e.g., a word processing application program, and wants to print a first coupon at a retail check-out lane at physical location 18-1 in a store, and then print a second coupon at another retail check-out lane at physical location 18-2. As described above with respect to FIG. 1, location-based address adapter 16-1 is associated with physical location 18-1, and peripheral device 14-1 is attached to location-based address adapter 16-1 at physical location 18-1. Also, location-based address adapter 16-2 is associated with physical location 18-2, and peripheral device 14-2 is attached to location-based address adapter 16-2 at physical location 18-2.

Host processor circuit 22-1 of host computer 12-1 executes program instructions to:
(1) run the client application program;
(2) receive a first user input command from the user, wherein the first user input command identifies the first physical location 18-1 to be a recipient for a first peripheral communications packet, and in response to the first user input command, the client application program uses the first unique physical location address 34-1 associated with physical location 18-1 to identify the address map 30-1 stored in mapping library 28-1;
(3) retrieve the first peripheral device network address 36-1 associated with the first unique physical location address 34-1 from address map 30-1;
(4) use the first peripheral device network address 36-1 to send the first peripheral communications packet to peripheral device 14-1 through location-based address adapter 16-1;
(5) receive a second user input command, wherein the second user input command identifies the physical location 18-2 to be a recipient for a second peripheral communications packet, and in response to the second user input command, the client application program uses the second unique physical location address 34-2 associated with physical location 18-2 to identify address map 30-2 stored in mapping library 28-1;
(6) retrieve the second peripheral device network address 36-2 associated with the second unique physical location address 34-2 from address map 30-2; and
(7) use the second peripheral device network address 36-2 to send the second peripheral communications packet to peripheral device 14-2 through location-based address adapter 16-2.

Upon a network router reboot, peripheral device processor circuit 42-1 may execute program instructions to update address map 30-1 to associate the first unique physical location address 34-1 with a first new network address. Peripheral device processor circuit 42-1 further executes program instructions to broadcast the updated address map 30-1 associated with physical location 18-1 to update the availability of peripheral device 14-1 to network system 10. Likewise, peripheral device processor circuit 42-2 may execute program instructions to update the address map 30-2 to associate the second unique physical location address 34-2 with a second new network address. Peripheral device processor circuit 42-2 further executes program instructions to broadcast the updated address map 30-2 associated with second unique physical location 18-2 to update the availability of peripheral device 14-2 to network system 10.

In one implementation of the present invention, peripheral device 14-1 is powered ON when location-based address adapter 16-1 is attached to peripheral device 14-1, and peripheral device 14-1 is powered OFF when location-based address adapter 16-1 is detached from peripheral device 14-1. When peripheral device 14-1 is powered ON, peripheral device processor circuit 42-1 executes program instructions to update address map 30-1 for any change in first peripheral device network address 36-1 associated with peripheral device 14-1.

Likewise, peripheral device 14-2 is powered ON when location-based address adapter 16-2 is attached to peripheral device 14-2, and peripheral device 14-2 is powered OFF when location-based address adapter 16-2 is detached from peripheral device 14-2. When peripheral device 14-2 is powered ON, peripheral device processor circuit 42-2 executes program instructions to update address map 30-2 for any change in second peripheral device network address 36-2 associated with peripheral device 14-2.

In accordance with the above description, the present embodiment of the invention provides the following advantages:

1. All required power and communication connections run through the location-based address adapter. This simplifies the physical installation of a peripheral device, such as a replacement peripheral device.

2. Electrical power is included in the connections to the peripheral device that is made by the location-based address adapter. In addition to simplifying the physical connection, this creates only one instance, i.e., power ON, when the unique physical location address (i.e., physical location ID) must be read from the location-based address adapter memory. The physical location address does not have to be read at any other trigger in the network (for example, through polling or by detecting cable plug in).

3. A non-network based address is used as the unique physical location address. This makes the system independent of the network configuration or the type of network. Thus, the location-based address adapter is independent of the actual type of network, e.g., Ethernet, Bluetooth, etc., in which the location-based address adapter is being used.

4. The location mapping is automatically maintained if the network address is changed (e.g., if a network component, such as a router, is rebooted).

It is contemplated that variations of the embodiment described herein may not include all of the features of the described embodiment, and thus, each of the stated advantages only applies when the feature that achieves a particular advantage is included in the variation.

While this invention has been described with respect to one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A location-based address adapter to facilitate communication between a host computer and one peripheral device of a plurality of peripheral devices, the location-based address adapter comprising:
a body removably attachable to each peripheral device of the plurality of peripheral devices, but removably attached to only one peripheral device at a time; and
an electrical circuit that includes a communications interface circuit and an adapter memory circuit,
the communications interface circuit having a plurality of communication input connectors, a plurality of communication output connectors, and a respective pass-through wired connection between each of the plurality of communication input connectors and the plurality of communication output connectors to facilitate bi-directional communications between the host computer and a respective peripheral device to which the body is attached, the adapter memory circuit storing a unique physical location address to be associated with a physical location associated with the peripheral device to which the body is attached, the unique physical location address being a non-network based address, the memory circuit having a memory connector to facilitate direct electrical communicative connection only with the respective peripheral device and not to the host computer.

2. The location-based address adapter of claim 1, the electrical circuit including an electrical power circuit, the electrical power circuit having a power input connector, a power output connector, and a pass-through connection between the power input connector and the power output connector, the power input connector facilitating electrical connection to an external power source and the power output connector facilitating electrical connection to the respective peripheral device to which the body is attached.

3. The location-based address adapter of claim 2, wherein the body includes:
   a recessed region having a side wall where each of the plurality of communication input connectors and the power input connector is accessed; and
   a hinged door pivotably attached to the body to cover the plurality of communication input connectors and the power input connector, the hinged door having at least one aperture to accommodate at least one communication cable and a power cable for attachment to the plurality of communication input connectors and the power input connector, respectively, with the hinged door closed.

4. A system having a plurality of peripheral devices at a plurality of peripheral device physical locations, comprising:
   a host computer having a host processor circuit and a host memory circuit,
   the host memory circuit being communicatively coupled to the host processor circuit, the host memory circuit including a mapping library that stores a plurality of address maps, each address map having a respective unique physical location address and an associated respective peripheral device network address;
   a first peripheral device of the plurality of peripheral devices, the first peripheral device having a first housing;
   a first location-based address adapter removably attached to the first housing, the first location-based address adapter having a first communications interface circuit and a first adapter memory circuit, the first communications interface circuit being connected in electrical communication with the first peripheral device and with the host computer,
   the first adapter memory circuit storing a first unique physical location address to be associated with a first physical location of the plurality of peripheral device physical locations, the first unique physical location address being a first non-network based address, the first adapter memory circuit being communicatively connected only to the first peripheral device.

5. The system of claim 4, wherein the first peripheral device includes a first peripheral device processor circuit that executes program instructions to retrieve the first unique physical location address from the first adapter memory circuit of the first location-based address adapter when the first location-based address adapter is initially connected to the first housing of the first peripheral device.

6. The system of claim 5, wherein the first peripheral device processor circuit executes program instructions to establish a first address map that associates the first unique physical location address stored in the first adapter memory circuit of the first location-based address adapter with a first peripheral device network address associated with the first peripheral device.

7. The system of claim 6, wherein the first peripheral device processor circuit executes program instructions to respond to a broadcast request for available services from the host computer by broadcasting the first address map.

8. The system of claim 7, wherein the host processor circuit executes program instructions to receive the broadcasted first address map and to store the first address map in the mapping library.

9. The system of claim 8, wherein the host processor circuit executes program instructions to:
   run a client application program;
   receive a first user input command, wherein the first user input command identifies the first physical location to be a recipient for a first peripheral communications packet, and in response to the first user input command, the client application program uses the first unique physical location address associated with the first physical location to identify the first address map stored in the mapping library;
   retrieve the first peripheral device network address associated with the first unique physical location address from the first address map; and
   use the first peripheral device network address to send the first peripheral communications packet to the first peripheral device through the first location-based address adapter.

10. The system of claim 6, wherein the first peripheral device processor circuit executes program instructions to:
    determine if the first peripheral device network address associated with the first peripheral device has changed to a new network address;
    update the first address map to associate the first unique physical location address with the new network address of the first peripheral device; and
    broadcast the updated first address map associated with the first unique physical location to update the availability of the first peripheral device to the system.

11. The system of claim 6, wherein the first peripheral device is powered ON when the first location-based address adapter is attached to the first peripheral device and the first peripheral device is powered OFF when the first location-based address adapter is detached from the first peripheral device, wherein when the first peripheral device is powered ON, the first peripheral device processor circuit executes program instructions to update the first address map for any change in the first peripheral device network address associated with the first peripheral device.

12. A system having a plurality of peripheral devices at a plurality of peripheral device physical locations, comprising:
    a host computer having a host processor circuit and a host memory circuit,
    the host memory circuit being communicatively coupled to a host processor circuit, the host memory circuit including a mapping library that stores a plurality of address maps, each address map having a respective unique physical location address and an associated respective peripheral device network address;

a first peripheral device of the plurality of peripheral devices, the first peripheral device having a first housing;

a second peripheral device of the plurality of peripheral devices, the second peripheral device having a second housing;

a first location-based address adapter removably attached to the first housing, the first location-based address adapter having a first communications interface circuit and a first adapter memory circuit, the first communications interface circuit being connected in electrical communication with the first peripheral device and with the host computer, the first adapter memory circuit for storing a first unique physical location address to be associated with a first physical location of the plurality of peripheral device physical locations, the first unique physical location address being a first non-network based address, the first adapter memory circuit being communicatively connected only to the first peripheral device; and a second location-based address adapter removably attached to the second housing, the second location-based address adapter having a second communications interface circuit and a second adapter memory circuit, the second communications interface circuit being connected in electrical communication with the second peripheral device and the host computer, the second adapter memory circuit storing a second unique physical location address to be associated with a second physical location of the plurality of peripheral device physical locations, the second unique physical location address being a second non-network based address, the second adapter memory circuit being communicatively connected only to the second peripheral device.

13. The system of claim 12, wherein:

the first peripheral device includes a first peripheral device processor circuit that executes program instructions to retrieve the first unique physical location address from the first adapter memory circuit of the first location-based address adapter when the first location-based address adapter is initially connected to the first housing of the first peripheral device; and the second peripheral device includes a second peripheral device processor circuit that executes program instructions to retrieve the second unique physical location address from the second adapter memory circuit of the second location-based address adapter when the second location-based address adapter is initially connected to the second housing of the second peripheral device.

14. The system of claim 13, wherein:

the first peripheral device processor circuit executes program instructions to establish a first address map that associates the first unique physical location address stored in the first adapter memory circuit of the first location-based address adapter with a first peripheral device network address associated with the first peripheral device; and the second peripheral device processor circuit executes program instructions to establish a second address map that associates the second unique physical location address stored in the second adapter memory circuit of the second location-based address adapter with a second peripheral device network address associated with the second peripheral device.

15. The system of claim 14, wherein:

the first peripheral device processor circuit executes program instructions to respond to a broadcast request for available services from the host computer by broadcasting the first address map; and the second peripheral device processor circuit executes program instructions to respond to the broadcast request for available services from the host computer by broadcasting the second address map.

16. The system of claim 15, wherein the host processor circuit executes program instructions to receive each of the broadcasted first address map and the broadcasted second address map and to store each of the first address map and the second address map in the mapping library.

17. The system of claim 16, wherein the host processor circuit executes program instructions to:

run a client application program;

receive a first user input command, wherein the first user input command identifies the first physical location to be a recipient for a first peripheral communications packet, and in response to the first user input command, the client application program uses the first unique physical location address associated with the first physical location to identify the first address map stored in the mapping library;

retrieve the first peripheral device network address associated with the first unique physical location address from the first address map;

use the first peripheral device network address to send the first peripheral communications packet to the first peripheral device through the first location-based address adapter;

receive a second user input command, wherein the second user input command identifies the second physical location to be a recipient for a second peripheral communications packet, and in response to the second user input command, the client application program uses the second unique physical location address associated with the second physical location to identify the second address map stored in the mapping library;

retrieve the second peripheral device network address associated with the second unique physical location address from the second address map; and use the second peripheral device network address to send the second peripheral communications packet to the second peripheral device through the second location-based address adapter.

18. The system of claim 17, wherein upon a reboot of a network router, the first peripheral device processor circuit executes program instructions to:

update the first address map to associate the first unique physical location address with a first new network address; and broadcast the updated first address map associated with the first physical location to update the availability of the first peripheral device to the system.

19. The system of claim 17, wherein upon a reboot of a network router, the second peripheral device processor circuit executes program instructions to:

update the second address map to associate the second unique physical location address with a second new network address; and broadcast the updated second address map associated with the second physical location to update the availability of the second peripheral device to the system.

20. The system of claim 17, wherein the client application program is never aware of a respective network address associated with any of the plurality of peripheral devices.

* * * * *